United States Patent
Brown et al.

(10) Patent No.: US 10,721,451 B2
(45) Date of Patent: Jul. 21, 2020

(54) ARRANGEMENT FOR, AND METHOD OF, LOADING FREIGHT INTO A SHIPPING CONTAINER

(71) Applicant: SYMBOL TECHNOLOGIES, LLC, Lincolnshire, IL (US)

(72) Inventors: Patrick Martin Brown, North Medford, NY (US); Paul Seiter, Port Jefferson Station, NY (US); Charles B. Swope, Coral Gables, FL (US); Chinmay Nanda, Port Jefferson Station, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/078,074

(22) Filed: Mar. 23, 2016

(65) Prior Publication Data

US 2017/0280125 A1 Sep. 28, 2017

(51) Int. Cl.
*H04N 13/122* (2018.01)
*H04N 13/243* (2018.01)
(Continued)

(52) U.S. Cl.
CPC ............. *H04N 13/122* (2018.05); *B65G 1/00* (2013.01); *G06T 5/50* (2013.01); *G06T 7/62* (2017.01);
(Continued)

(58) Field of Classification Search
CPC ...... H04N 13/122; H04N 13/243; G06T 5/50; G06T 7/62; G06T 2207/10028;
(Continued)

(56) References Cited

U.S. PATENT DOCUMENTS 5,408,322 A 4/1995 Hsu et al.
5,588,098 A * 12/1996 Chen .................... G06F 3/04845
345/653

(Continued)

FOREIGN PATENT DOCUMENTS

CA 2835830 A1 11/2012
CN 104200086 A 12/2014
(Continued)

OTHER PUBLICATIONS

MacNamara, S., et al., "Volume measuring device for mobile objects," English Translation of European Patent Publication EP2439487 B1, Published Aug. 22, 2012.*

(Continued)

*Primary Examiner* — Xuemei G Chen

(74) *Attorney, Agent, or Firm* — Yuri Astvatsaturov

(57) ABSTRACT

A plurality of three-dimensional (3D) cameras is deployed about a zone through which freight is conveyed to a shipping container. The 3D cameras have sensors with fields of view over which a plurality of point clouds of voxels are captured from the freight. A server combines the point clouds to obtain a composite point cloud of the freight, encloses the composite point cloud with a bounding box having dimensions, and dimensions the freight from the dimensions of the bounding box. An optional scale weighs the freight while it is being dimensioned and moved through the zone.

9 Claims, 9 Drawing Sheets

(51) Int. Cl.
*B65G 1/00* (2006.01)
*G06T 7/62* (2017.01)
*G06T 5/50* (2006.01)

(52) U.S. Cl.
CPC ... *H04N 13/243* (2018.05); *B65G 2203/0208* (2013.01); *B65G 2203/0258* (2013.01); *B65G 2203/041* (2013.01); *G06T 2207/10028* (2013.01)

(58) Field of Classification Search
CPC .............. B65G 1/00; B65G 2203/0208; B65G 2203/041; B65G 2203/0258
USPC ........... 1/1; 340/928; 348/42, 47, 48, 49, 50; 356/5.1; 600/1; 705/23, 332, 414
See application file for complete search history.

(56) References Cited

U.S. PATENT DOCUMENTS

| | | | |
|---|---|---|---|
| 5,988,862 A | 11/1999 | Kacyra et al. | |
| 6,115,114 A | 9/2000 | Berg et al. | |
| 6,995,762 B1 | 2/2006 | Pavlidis et al. | |
| 7,137,207 B2 | 11/2006 | Armstrong et al. | |
| 7,248,754 B2 | 7/2007 | Cato | |
| 7,277,187 B2* | 10/2007 | Smith | G01B 11/00 340/928 |
| 7,373,722 B2 | 5/2008 | Cooper et al. | |
| 7,399,220 B2* | 7/2008 | Kriesel | A01K 11/008 452/157 |
| 7,474,389 B2* | 1/2009 | Greenberg | G01B 11/00 356/5.1 |
| 7,487,595 B2 | 2/2009 | Armstrong et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,726,575 B2 | 6/2010 | Wang et al. | |
| 8,094,937 B2 | 1/2012 | Teoh et al. | |
| 8,132,728 B2 | 3/2012 | Dwinell et al. | |
| 8,134,717 B2 | 3/2012 | Pangrazio et al. | |
| 8,199,977 B2 | 6/2012 | Krishnaswamy et al. | |
| 8,265,895 B2 | 9/2012 | Willins et al. | |
| 8,284,988 B2 | 10/2012 | Sones et al. | |
| 8,381,982 B2* | 2/2013 | Kunzig | G01S 5/16 235/462.08 |
| 8,463,079 B2 | 6/2013 | Ackley et al. | |
| 8,479,996 B2 | 7/2013 | Barkan et al. | |
| 8,542,252 B2 | 9/2013 | Perez et al. | |
| 8,599,303 B2 | 12/2013 | Stettner | |
| 8,660,338 B2 | 2/2014 | Ma et al. | |
| 8,743,176 B2* | 6/2014 | Stettner | G01S 17/023 348/42 |
| 8,757,479 B2 | 6/2014 | Clark et al. | |
| 8,812,226 B2* | 8/2014 | Zeng | G01S 13/723 382/103 |
| 8,867,827 B2* | 10/2014 | Yeatman, Jr. | H04N 13/239 382/154 |
| 8,989,342 B2* | 3/2015 | Liesenfelt | G01N 23/203 378/12 |
| 9,007,601 B2* | 4/2015 | Steffey | G01B 11/002 356/614 |
| 9,070,285 B1 | 6/2015 | Ramu | |
| 9,129,277 B2 | 9/2015 | MacIntosh | |
| 9,329,269 B2* | 5/2016 | Zeng | G01S 17/58 |
| 9,348,055 B2* | 5/2016 | Abenaim | G01V 5/0008 |
| 9,396,554 B2* | 7/2016 | Williams | G01B 11/00 |
| 9,400,170 B2* | 7/2016 | Steffey | G01B 21/045 |
| 9,436,987 B2* | 9/2016 | Ding | G06T 7/00 |
| 9,549,125 B1 | 1/2017 | Goyal et al. | |
| 9,562,971 B2* | 2/2017 | Shenkar | G01S 17/023 |
| 9,600,892 B2* | 3/2017 | Patel | G06T 7/11 |
| 9,761,015 B2* | 9/2017 | Xiao | G06K 9/00 |
| 9,778,388 B1 | 10/2017 | Connor | |
| 9,791,862 B1 | 10/2017 | Connor | |
| 9,866,815 B2* | 1/2018 | Vrcelj | G06K 9/34 |
| 9,875,427 B2* | 1/2018 | Medasani | G06K 9/4671 |
| 9,938,092 B2 | 4/2018 | McMurrough et al. | |
| 10,096,131 B2* | 10/2018 | Driegen | G06T 7/85 |
| 10,275,931 B2* | 4/2019 | Morovic | G06T 15/503 |
| 10,362,293 B2* | 7/2019 | Mesher | B61K 9/08 |
| 2001/0041948 A1 | 11/2001 | Ross et al. | |
| 2002/0164236 A1 | 7/2002 | Fukuhara et al. | |
| 2002/0158453 A1 | 10/2002 | Levine | |
| 2004/0240754 A1 | 2/2004 | Smith et al. | |
| 2005/0016004 A1 | 1/2005 | Armstrong et al. | |
| 2005/0114059 A1 | 5/2005 | Chang et al. | |
| 2006/0106742 A1* | 5/2006 | Bochicchio | G01G 19/083 705/414 |
| 2007/0074410 A1 | 4/2007 | Armstrong et al. | |
| 2007/0272732 A1 | 11/2007 | Hindmon | |
| 2008/0238919 A1 | 10/2008 | Pack | |
| 2009/0088975 A1 | 4/2009 | Sato et al. | |
| 2009/0103773 A1 | 4/2009 | Wheeler et al. | |
| 2009/0152391 A1 | 6/2009 | McWhirk | |
| 2009/0323121 A1 | 12/2009 | Valkenburg et al. | |
| 2010/0026804 A1 | 2/2010 | Tanizaki et al. | |
| 2010/0091094 A1* | 4/2010 | Sekowski | B66F 9/0755 348/50 |
| 2010/0118116 A1 | 5/2010 | Tomasz | |
| 2010/0131234 A1 | 5/2010 | Stewart et al. | |
| 2010/0208039 A1* | 8/2010 | Stettner | G01B 11/00 348/49 |
| 2010/0295850 A1 | 11/2010 | Katz | |
| 2010/0315412 A1 | 12/2010 | Sinha et al. | |
| 2011/0047636 A1 | 2/2011 | Stachon et al. | |
| 2011/0052043 A1 | 3/2011 | Hung | |
| 2011/0137527 A1 | 6/2011 | Simon et al. | |
| 2011/0168774 A1 | 7/2011 | Magal | |
| 2011/0172875 A1 | 7/2011 | Gibbs | |
| 2011/0216063 A1 | 9/2011 | Hayes | |
| 2011/0286007 A1 | 11/2011 | Pangrazio et al. | |
| 2011/0310088 A1 | 12/2011 | Adabala et al. | |
| 2012/0075342 A1 | 3/2012 | Choubassi et al. | |
| 2012/0179621 A1* | 7/2012 | Moir | G01G 23/3735 705/332 |
| 2012/0185112 A1 | 7/2012 | Sung et al. | |
| 2012/0209553 A1 | 8/2012 | Doytchinov et al. | |
| 2012/0236119 A1 | 9/2012 | Rhee | |
| 2012/0249802 A1 | 10/2012 | Taylor | |
| 2012/0250978 A1 | 10/2012 | Taylor | |
| 2012/0287249 A1* | 11/2012 | Choo | H04N 5/2258 348/47 |
| 2013/0144565 A1 | 6/2013 | Miller | |
| 2013/0156292 A1 | 6/2013 | Chang et al. | |
| 2013/0162806 A1 | 6/2013 | Ding et al. | |
| 2013/0228620 A1 | 9/2013 | Ahern et al. | |
| 2013/0236089 A1 | 9/2013 | Litvak et al. | |
| 2013/0299306 A1 | 11/2013 | Jiang et al. | |
| 2013/0299313 A1 | 11/2013 | Baek, IV et al. | |
| 2013/0321418 A1 | 12/2013 | Kirk | |
| 2013/0329013 A1 | 12/2013 | Metois et al. | |
| 2013/0341400 A1 | 12/2013 | Lancaster-Larocque | |
| 2014/0002597 A1 | 1/2014 | Taguchi | |
| 2014/0028837 A1 | 1/2014 | Gao et al. | |
| 2014/0049616 A1 | 2/2014 | Stettner | |
| 2014/0098094 A1 | 4/2014 | Neumann | |
| 2014/0100813 A1 | 4/2014 | Showering | |
| 2014/0104413 A1 | 4/2014 | McCloskey et al. | |
| 2014/0192050 A1 | 7/2014 | Qiu | |
| 2014/0267614 A1 | 9/2014 | Ding et al. | |
| 2014/0267619 A1* | 9/2014 | Bridges | G01B 11/002 348/46 |
| 2014/0267688 A1 | 9/2014 | Aich et al. | |
| 2014/0300637 A1 | 10/2014 | Fan et al. | |
| 2014/0351073 A1* | 11/2014 | Murphy | G06Q 10/00 705/23 |
| 2015/0015602 A1 | 1/2015 | Beaudoin | |
| 2015/0088618 A1 | 3/2015 | Basir et al. | |
| 2015/0092066 A1 | 4/2015 | Geiss et al. | |
| 2015/0106403 A1 | 4/2015 | Haverinen et al. | |
| 2015/0154467 A1 | 6/2015 | Feng | |
| 2015/0161793 A1* | 6/2015 | Takahashi | A61N 5/1049 600/1 |

(56) References Cited

U.S. PATENT DOCUMENTS

| | | | |
|---|---|---|---|
| 2015/0181198 A1 | 6/2015 | Baele et al. | |
| 2015/0379704 A1 | 12/2015 | Chandrasekar et al. | |
| 2016/0021355 A1* | 1/2016 | Alpaslan | H04N 13/30 |
| | | | 348/43 |
| 2016/0044862 A1 | 2/2016 | Kocer | |
| 2016/0061591 A1 | 3/2016 | Pangrazio et al. | |
| 2016/0070981 A1 | 3/2016 | Sasaki et al. | |
| 2016/0012588 A1 | 4/2016 | Taguchi | |
| 2016/0107690 A1 | 4/2016 | Oyama et al. | |
| 2016/0140769 A1* | 5/2016 | Reitmayr | G06T 19/20 |
| | | | 345/420 |
| 2016/0150217 A1* | 5/2016 | Popov | G06T 15/04 |
| | | | 348/48 |
| 2016/0156898 A1* | 6/2016 | Ren | H04N 13/0029 |
| | | | 348/43 |
| 2016/0163067 A1 | 7/2016 | Williams | |
| 2017/0004649 A1* | 1/2017 | Collet Romea | G06T 15/205 |
| 2017/0041553 A1* | 2/2017 | Cao | G06T 5/50 |
| 2017/0059306 A1* | 3/2017 | Lasater | G01B 11/24 |
| 2017/0066459 A1 | 3/2017 | Singh | |
| 2017/0150129 A1 | 5/2017 | Pangrazio | |
| 2017/0227647 A1* | 8/2017 | Baik | G01S 17/936 |
| 2017/0228885 A1* | 8/2017 | Baumgartner | G06T 7/62 |
| 2018/0068266 A1 | 3/2018 | Kirmani et al. | |
| 2018/0290845 A1 | 10/2018 | McMurrough et al. | |

FOREIGN PATENT DOCUMENTS

| | | |
|---|---|---|
| EP | 2439487 A1 | 4/2012 |
| EP | 2562688 A2 | 2/2013 |
| EP | 2693362 A1 | 2/2014 |
| WO | 2003/002935 A1 | 1/2003 |
| WO | 2008/057504 A2 | 5/2008 |
| WO | 2008/154611 A2 | 12/2008 |
| WO | 2013165674 | 11/2013 |
| WO | 2014/092552 A2 | 6/2014 |
| WO | 2015/127503 A1 | 9/2015 |
| WO | 2016/020038 A1 | 2/2016 |

OTHER PUBLICATIONS

"Fair Billing with Automatic Dimensioning" pp. 1-4, undated, Copyright Mettler-Toledo International Inc.
"Swift Dimension" Trademark Omniplanar, Copyright 2014.
"Plane Detection in Point Cloud Data" dated Jan. 25, 2010 by Michael Ying Yang and Wolfgang Forstner, Technical Report 1, 2010, University of Bonn.
Fu et al., U.S. Appl. No. 15/385,113, filed Dec. 20, 2016.
Brown et al., U.S. Appl. No. 15/008,710, filed Jan. 28, 2016.
Lecking et al., "Localization in a wide range of industrial environments using relative 3D ceiling features," IEEE, pp. 333-337, Sep. 15, 2008.
Carreira et al., "Enhanced PCA-based localization using depth maps with missing data," IEEE, pp. 1-8 , Apr. 24, 2013.
Clayton et al., U.S. Appl. No. 15/358,810, filed Nov. 22, 2016.
Swope et al., U.S. Appl. No. 15/015,228, filed Feb. 4, 2016.
Ziang Xie et al., "Multimodal Blending for High-Accuracy Instance Recognition", 2013 IEEE/RSJ International Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Federico Tombari et al. "Multimodal cue integration through Hypotheses Verification for RGB-D object recognition and 6DOF pose estimation", IEEE International Conference on Robotics and Automation, Jan. 2013.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Gu et al., U.S. Appl. No. 15/242,126, filed Aug. 19, 2016.
Dubois, M., et al., "A comparison of geometric and energy-based point cloud semantic segmentation methods," European Conference on Mobile Robots (ECMR), vol., No., pp. 88-93, Sep. 2013.
Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31, 2011, Calgary, Canada.
Rusu, et al. "Spatial change detection on unorganized point cloud data," PCL Library, retrieved from Internet on Aug. 19, 2016 [http://pointclouds.org/documentation/tutorials/octree_change_php].
Tahir, Rabbani, et al., "Segmentation of point clouds using smoothness constraint," International Archives of Photogrammetry, Remote Sensing and Spatial Information Sciences 36.5 (Sep. 2006): 248-253.
Golovinskiy, Aleksey, et al. "Min-cut based segmentation of point clouds." Computer Vision Workshops (ICCV Workshops), 2009 IEEE 12th International Conference on. IEEE, 2009.
Douillard, Bertrand, et al. "On the segmentation of 3D LIDAR point clouds."Robotics and Automation (ICRA), 2011 IEEE International Conference on. IEEE, 2011.
Puwein, J., et al., "Robust multi-view camera calibration for wide-baseline camera networks," in IEEE Workshop on Applications of Computer Vision (WACV), Jan. 2011.
Datta, A., et al., "Accurate camera calibration using iterative refinement of control points," in Computer Vision Workshops (ICCV Workshops), 2009.
Olson, Clark F., et al. "Wide-Baseline Stereo Vision for Terrain Mapping" in Machine Vision and Applications, Aug. 2010.
Rusu, et al., "How to incrementally register pairs of clouds," PCL Library, retrieved from the Internet on Aug. 22, 2016 from <http://pointclouds.org/documentation/tutorials/pairwise_incremental_registration_php>.
Zheng et al., U.S. Appl. No. 15/131,856, filed Apr. 18, 2016.
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.
Schnabel et al. "Efficient RANSAC for Point-Cloud Shape Detection", vol. 0, No. 0, pp. 1-12.
Buenaposada et al. "Real-time tracking and estimation of plane pose" Proceedings of the ICPR (Aug. 2002) vol. II, IEEE pp. 697-700.
International Search Report and Written Opinion for International Patent Application No. PCT/US2017/024847 dated Jul. 7, 2017.

* cited by examiner

ARRANGEMENT FOR, AND METHOD OF, LOADING FREIGHT INTO A SHIPPING CONTAINER

BACKGROUND OF THE INVENTION

The present disclosure relates generally to an arrangement for, and a method of, loading freight into a shipping container and, more particularly, to dimensioning and/or weighing the freight in an uninterrupted, continuous manner prior to loading.

It is generally known in the shipping industry to use industrial vehicles, such as forklifts, to lift and move freight, typically mounted on pallets, from warehouses or like facilities into shipping containers for transport by truck, railroad, boat, and airplane, etc. Since the recipients of the freight are typically charged by the dimensions (volume) and weight of the freight, it is known to dimension and weigh the freight prior to loading. Knowing the dimensions of the freight is also useful for determining the order in which the freight is to be loaded, and to fill as much of the shipping container as possible for efficient handling and distribution.

To that end, it is known for a forklift to lift and advance the freight to a weighing scale or dimensioning station while sometimes first waiting for access to the scale/station, to then stop and lower the freight onto the scale/station, and to then retreat and back away from the scale/station while the freight is being weighed or dimensioned. While the freight is stationary at the scale/station, a set of overhead laser scanners with range finders are moved above and past the freight over a time period of several seconds during which the freight is scanned, and range information from the freight is captured. The range information is then processed by processing equipment to obtain the dimensions of the freight. After the scanning, the forklift starts again, returns to the scale/station, lifts the freight off the scale/station, and then advances to the shipping container to be loaded. Although generally useful, this known dimensioning and weighing procedure has not proven to be altogether satisfactory in practice not only due to the high cost of the scanners and associated processing equipment, but also, even more importantly, due to the interrupted movement of the freight. As described, the forklift has to be repeatedly stopped and started, and the scanning/dimensioning of each item of freight takes a non-negligible amount of time to be performed. The loading procedure of the shipping container is thus delayed and is inefficient.

Accordingly, it would be desirable to expedite, and more efficiently conduct, the loading procedure, and to dimension and/or weigh the freight in an uninterrupted, frictionless, continuous, and more cost-effective manner prior to loading.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
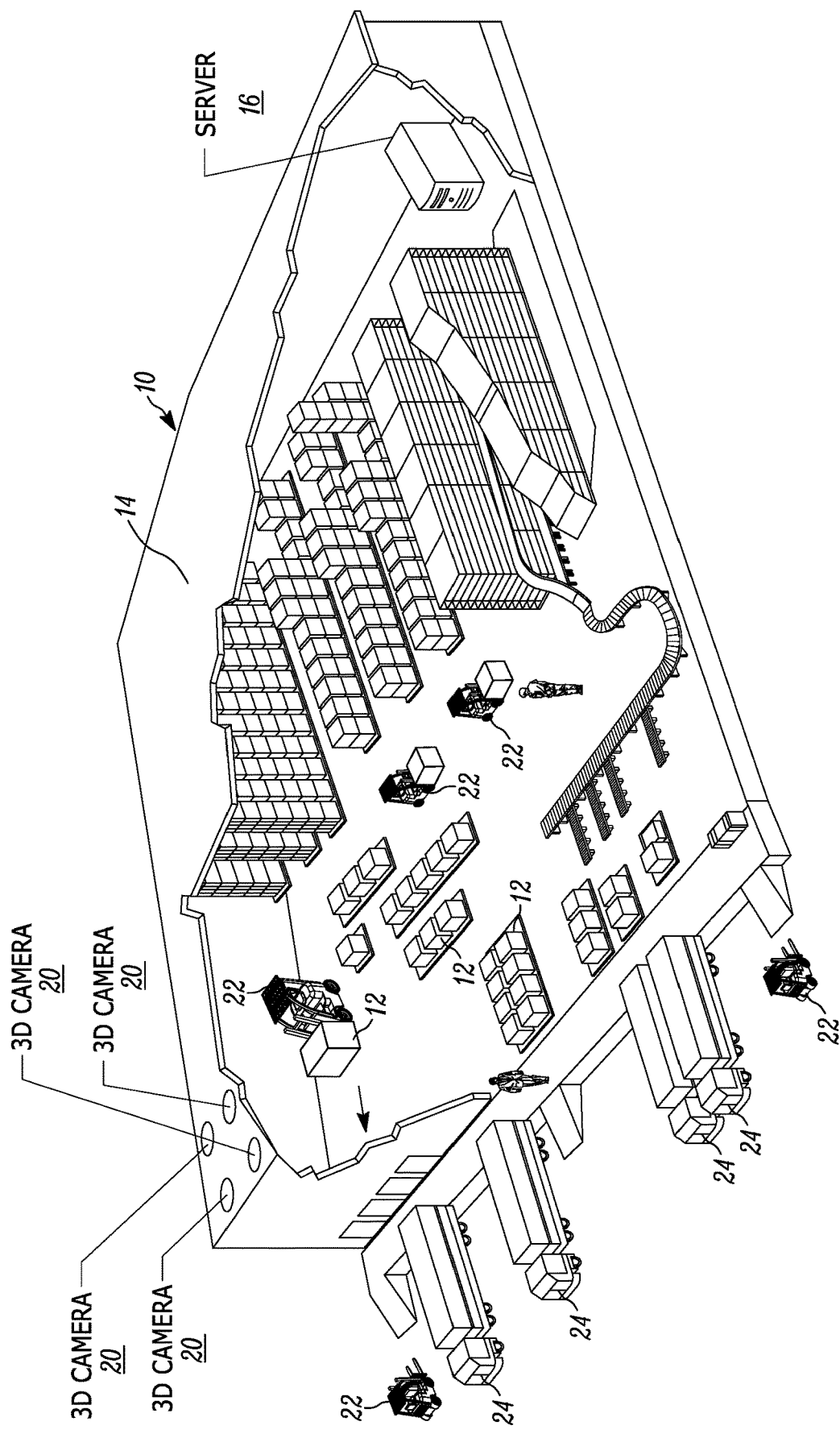
FIG. 1 is a broken-away, perspective, schematic view, as seen from above, of an arrangement of multiple, overhead, three-dimensional (3D) cameras deployed in a warehouse in accordance with this disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an arrangement for loading freight into a shipping container, typically for transport by land, water, and air, etc. A plurality or set of three-dimensional (3D) cameras is deployed, preferably stationarily mounted, about a zone through which the freight is conveyed to the shipping container. The 3D cameras are positioned either above, and/or at sides of, the zone and look at the freight. The 3D cameras have sensors with fields of view over which a plurality of point clouds of voxels or data points are captured from the freight. A server or programmed microprocessor is operatively connected to the cameras. The server combines the point clouds to obtain a composite point cloud of the freight, encloses the composite point cloud with a minimum bounding box having dimensions, and dimensions the freight from the dimensions of the bounding box. An optional scale may be provided for weighing the freight at any time, and advantageously simultaneously with the freight being dimensioned and moved through the zone by a freight mover. When the freight is being moved, for example, by a forklift, through the zone, the weighing may be performed by a scale aboard the forklift, and the dimensioning and/or weighing of the freight are simultaneously performed in an uninterrupted, frictionless, continuous, and cost-effective manner prior to loading. Put another way, the forklift is not repeatedly stopped and started, and does not have to wait for access to the scale and/or to wait for the dimensioning of the freight to be performed. Instead, the forklift continuously advances to the shipping container, thereby expediting the loading procedure and rendering it more efficient.

Advantageously, each voxel has a range or depth value indicative of a distance between a respective 3D camera and the freight, and/or an intensity value indicative of a received signal strength captured by the respective 3D camera from the freight. Each voxel is associated with a set of coordinates that define a position of each voxel. The 3D cameras capture a plurality of the sets of the coordinates of each voxel. In one embodiment, the server combines the point clouds by averaging the sets of the coordinates of each voxel. In another embodiment, the server weights the sets of the coordinates of each voxel from the different 3D cameras with different weighting factors that are based on the range value and/or the intensity value, prior to averaging. In still another embodiment, the 3D cameras have different types of the sensors, and the server weights the sets of the coordinates of each voxel from the different 3D cameras with different weighting factors that are based on the different types of the sensors, prior to averaging. In yet another embodiment, each voxel also has a confidence value, and the server weights the sets of the coordinates of each voxel from the different 3D cameras based on the confidence value, prior to averaging. In an additional embodiment, the 3D cameras are operated under variable environmental conditions, and the server weights the sets of the coordinates of each voxel from the different 3D cameras with different weighting factors that are based on the variable environmental conditions. Also, each field of view is angular, and the server weights the sets of the coordinates of each voxel from the different 3D cameras with different weighting factors that are based on the angle of the respective voxel in the respective field of view.

A further aspect of this disclosure is directed to a method of loading freight into a shipping container. The method is performed by deploying a plurality of 3D cameras about a zone through which the freight is conveyed to the shipping container, and capturing a plurality of point clouds of voxels or data points from the freight over fields of view of sensors of the 3D cameras. The method is further performed by combining the point clouds to obtain a composite point cloud of the freight, enclosing the composite point cloud with a minimum bounding box having dimensions, and dimensioning the freight from the dimensions of the bounding box.

Turning now to the drawings, reference numeral 10 in FIG. 1 generally schematically depicts a warehouse or like facility in which a plurality or set of three-dimensional (3D) cameras 20 is stationarily mounted, for example, overhead on a ceiling 14, above a 3D zone 18 (see FIGS. 2-3) extending upwardly from a floor of the warehouse 10. The 3D zone 18 is preferably situated at a doorway or portal of the warehouse, e.g., adjacent a loading bay or dock. Although FIG. 1 depicts a single set of the 3D cameras 20 adjacent a corner of the warehouse 10, it will be understood that multiple sets of 3D cameras 20 can be deployed in, and not necessarily in the corner of, the warehouse 10. Freight 12, depicted as cuboid cartons for simplicity, and preferably mounted on pallets, are moved, for example, by industrial freight-moving vehicles, such as forklifts 22 having powered, pronged platforms to lift and lower the freight 12. Preferably, one or more sets of the 3D cameras 20 are deployed in one or more loading paths where some, or preferably all, the freight 12 passes, and each platform has a weighing scale 34 (see FIG. 3) aboard to weigh the freight 12 on the platform. The forklifts 22 move the freight 12 from the warehouse 10 to shipping containers that are aboard trucks 24 or other modes of transport carriers, such as vans, railroad cars, boats, airplanes, etc. As also shown in FIG. 1, a host computer or server 16, typically located in a backroom at the warehouse 10, comprises one or more programmed computers and is in wired, wireless, direct, or networked communication with each camera 20. The server 16 is preferably a local computer, but can also be a remote cloud server. The server 16 may include a wireless RF transceiver that communicates with each camera 20. For example, Wi-Fi and Bluetooth® are open wireless standards for exchanging data between electronic devices.

Figure 2:
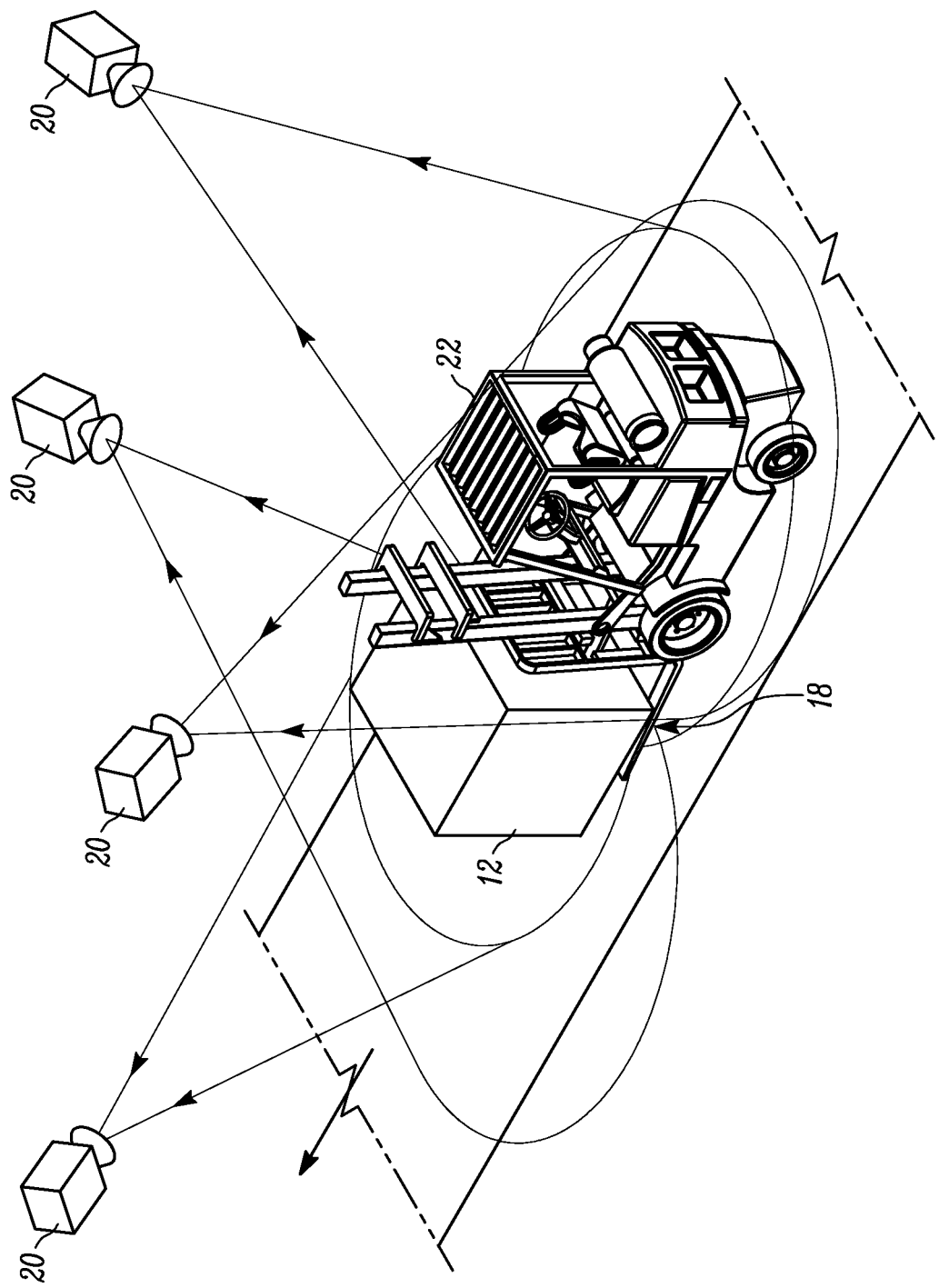
FIG. 2 is an enlarged, perspective view, as seen from above, of a forklift moving freight underneath the 3D cameras of FIG. 1.
Figure 4:
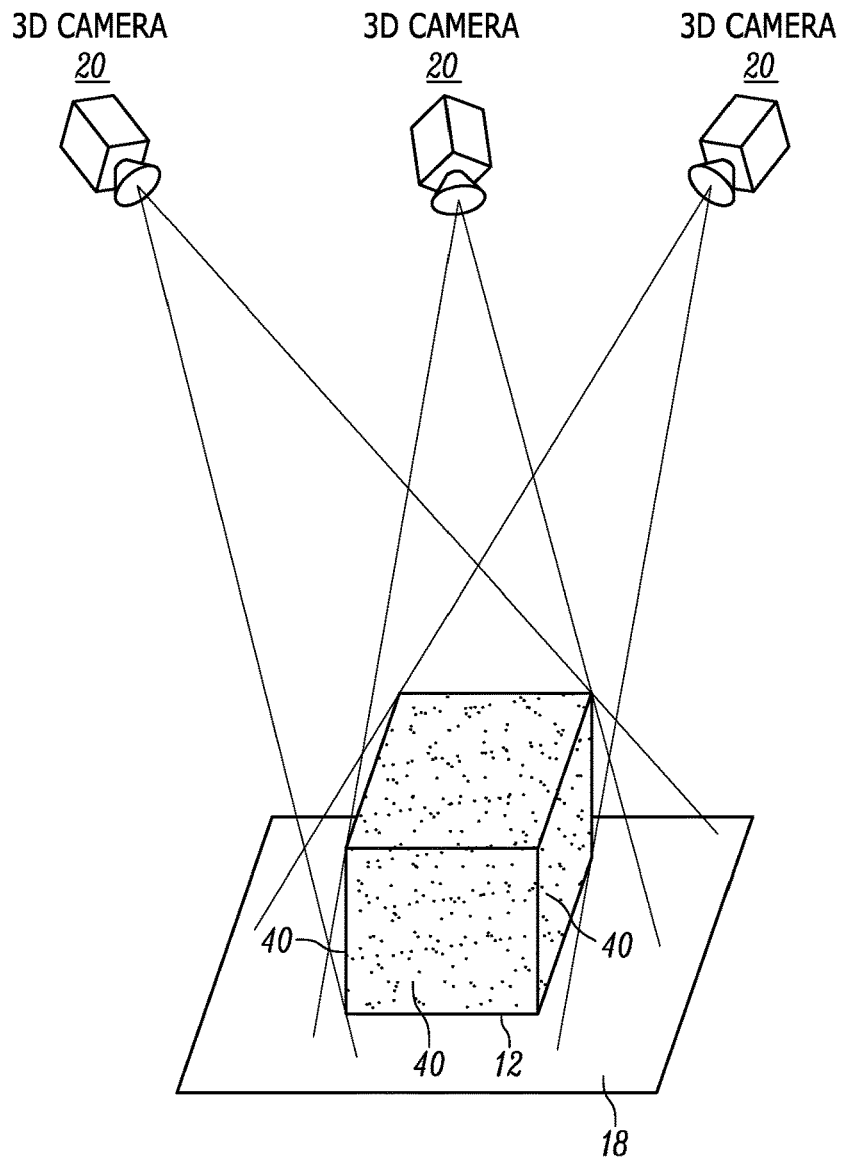
FIG. 4 is a perspective view of a plurality of point clouds captured by the 3D cameras of FIG. 1.

As more clearly shown in FIG. 2, the 3D cameras 20 are deployed about the 3D zone 18 through which the freight 12 is conveyed to the shipping container. In accordance with one embodiment, the 3D cameras 20 are positioned above the 3D zone 18 and look at the freight 12 along different, intersecting lines of sight. The 3D cameras 20 may either face the freight directly along direct paths as illustrated, or indirectly along folded paths using field mirrors. The 3D cameras 20 have sensors with angular fields of view each generally centered on a respective line of sight. As described below, the 3D cameras 20 capture a plurality of point clouds 40 (see FIG. 4) of voxels or data points from the moving freight 12. Alternatively, one or more of the 3D cameras 20 can look at the freight 12 along the same line of sight and capture different point clouds 40 by operating their sensors at different wavelengths.

Preferably, each 3D camera 20 incorporates time-of-flight (TOF) technology in which the sensor is a two-dimensional array of sensors or pixels, such as a charge coupled device (CCD) or a complementary metal oxide semiconductor (CMOS) device, together with an active modulated light source, such as a solid-state laser or a light emitting diode (LED) operating in the near-infrared range, e.g., between 700 nm and 1000 nm. The light source illuminates the freight 12 with outgoing illumination light, and the reflected return light is captured. The phase shift between the outgoing and the return light is measured and translated into range values indicative of distances (depth) between the 3D camera and the freight 12. It will be understood that this disclosure is not intended to be limited to 3D cameras having TOF technology, because other 3D technologies, such as stereo vision and structured-light may also be employed. As another example, a bank of two-dimensional cameras can replace a single 3D camera. In any event, the 3D cameras 20 need not all be identical and all of the same type, but can be of different types, and can be arranged in any combination.

Figure 3:
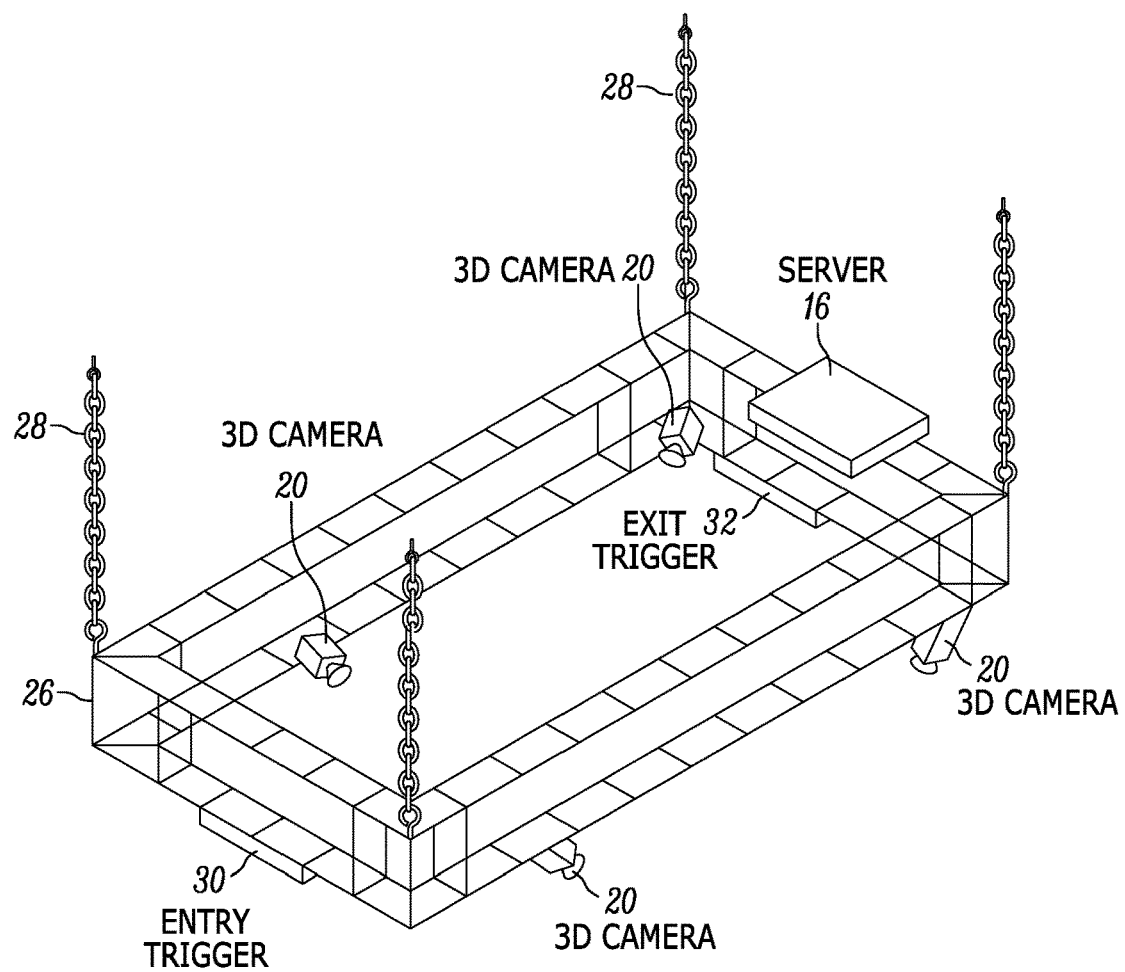
FIG. 3 is a perspective view of a forklift moving freight underneath the 3D cameras of FIG. 2 in accordance with one embodiment of this disclosure.
Figure 3:
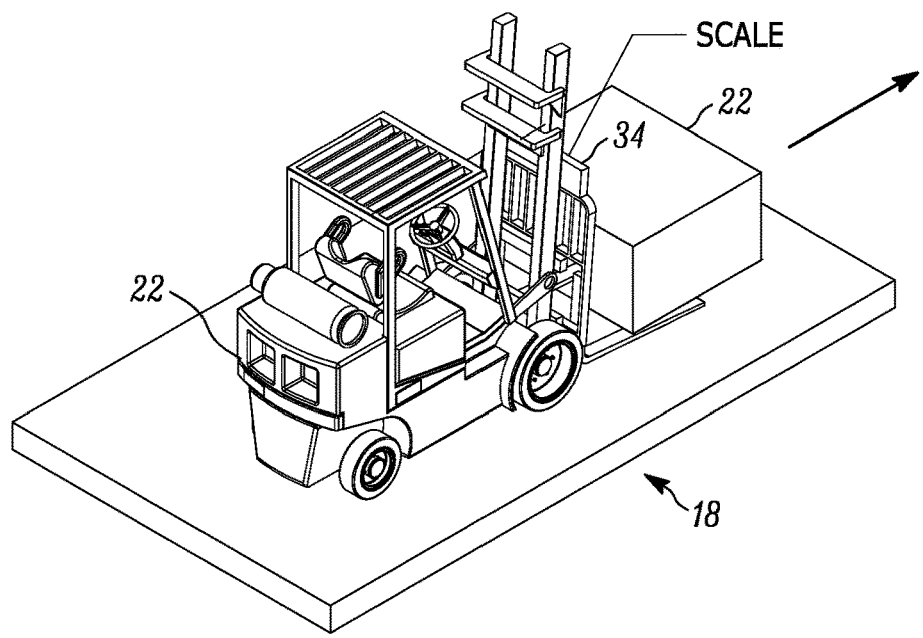

As shown in FIG. 3, the cameras 20 need not, and often are not, mounted directly on the ceiling 14, but may be mounted on an overhead scaffolding 26 that is either suspended by chains 28 from the ceiling as illustrated, or that is supported on upright posts resting on the warehouse floor. As also shown in FIG. 3, the server 16 could be mounted on the overhead scaffolding 26. In addition, an entry trigger 30 and an exit trigger 32 are mounted on the overhead scaffolding 26, and each trigger emits a light curtain downwardly towards the floor. When the freight 12 passes through the light curtain of the entry trigger 30, this signifies that the freight has entered the 3D zone 18, and the server 16 responsively commands the cameras to operate, either simultaneously or sequentially, and capture point clouds 40 of voxels or data points from the moving freight 12. When the freight 12 passes through the light curtain of the exit trigger 32, this signifies that the freight has departed the 3D zone 18, and the server 16 responsively commands the cameras 20 to cease their operation. It will be understood that this disclosure is not intended to be limited to such triggers 30, 32, because many other triggers could have been employed. For example, pressure sensors could be mounted at the entry and exit of the 3D zone 18, each of these sensors being activated by pressure exerted thereon by the wheels of the moving forklift 22. As another example, the entry and exit triggers could be implemented by one or more cameras that are operated to detect entry and exit of the 3D zone 18 by imaging and capturing a part of the forklift 22, e.g., a logo thereon.

Figure 5:
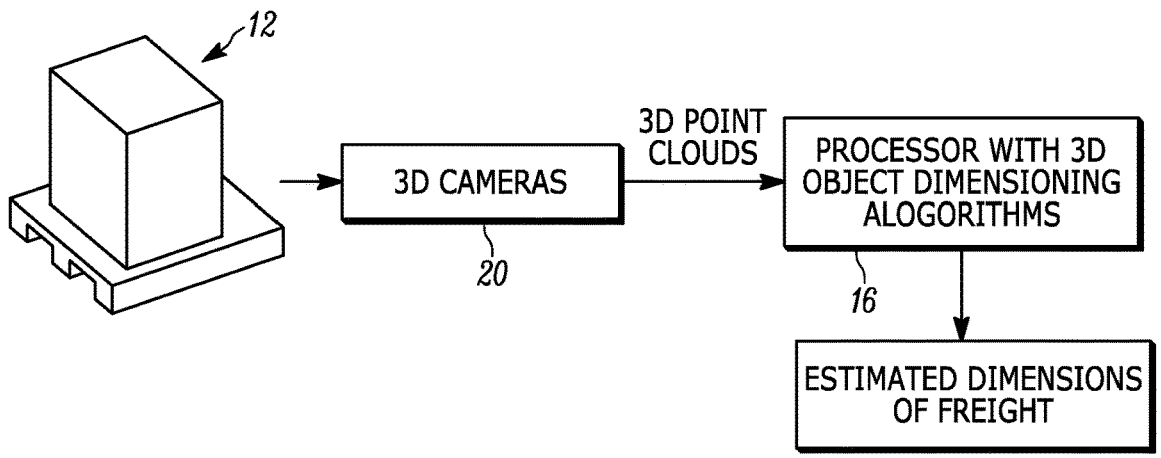
FIG. 5 is a simplified, overall view of how the dimensions of the freight are determined by the 3D cameras of FIG. 1.
Figure 6:
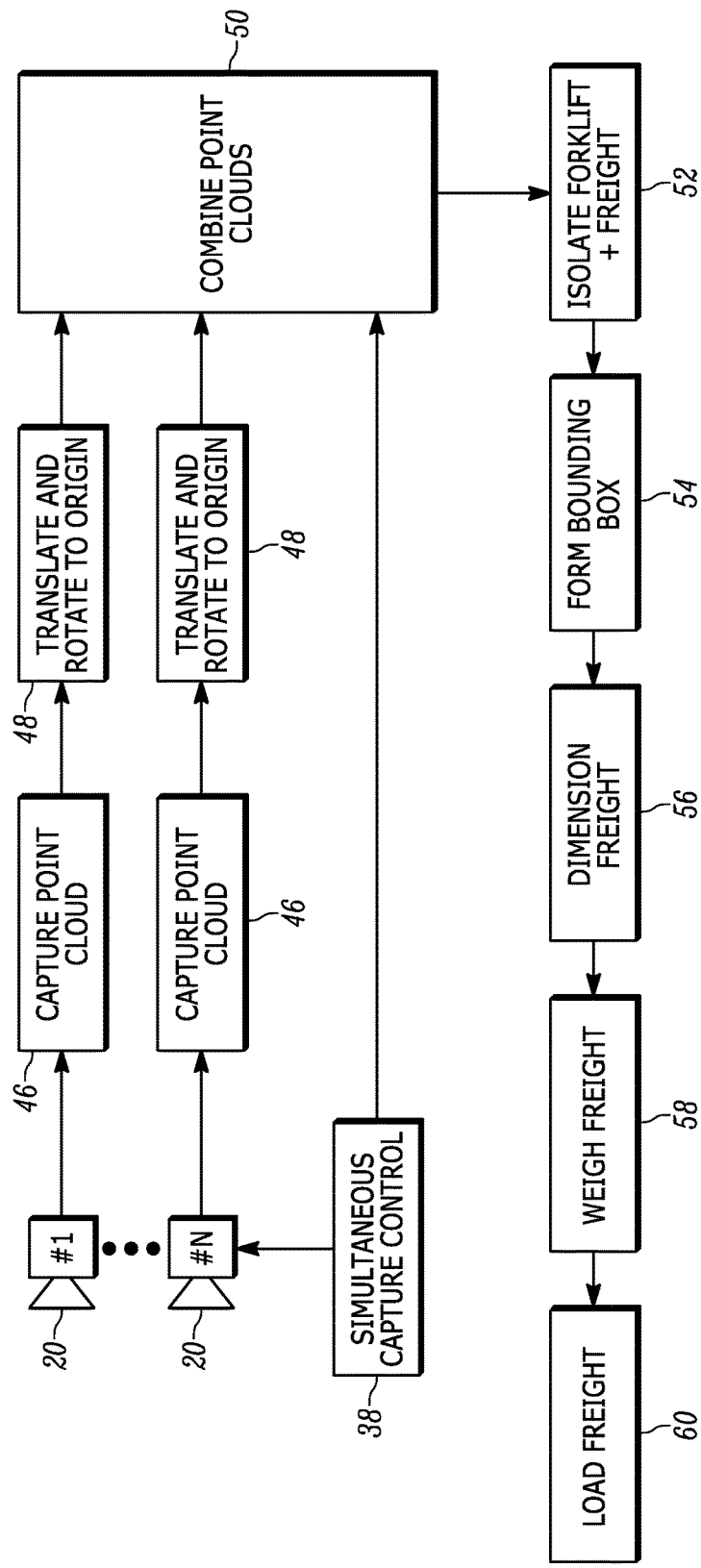
FIG. 6 is a flow chart depicting a method in accordance with the embodiment of FIG. 3.
Figure 11:
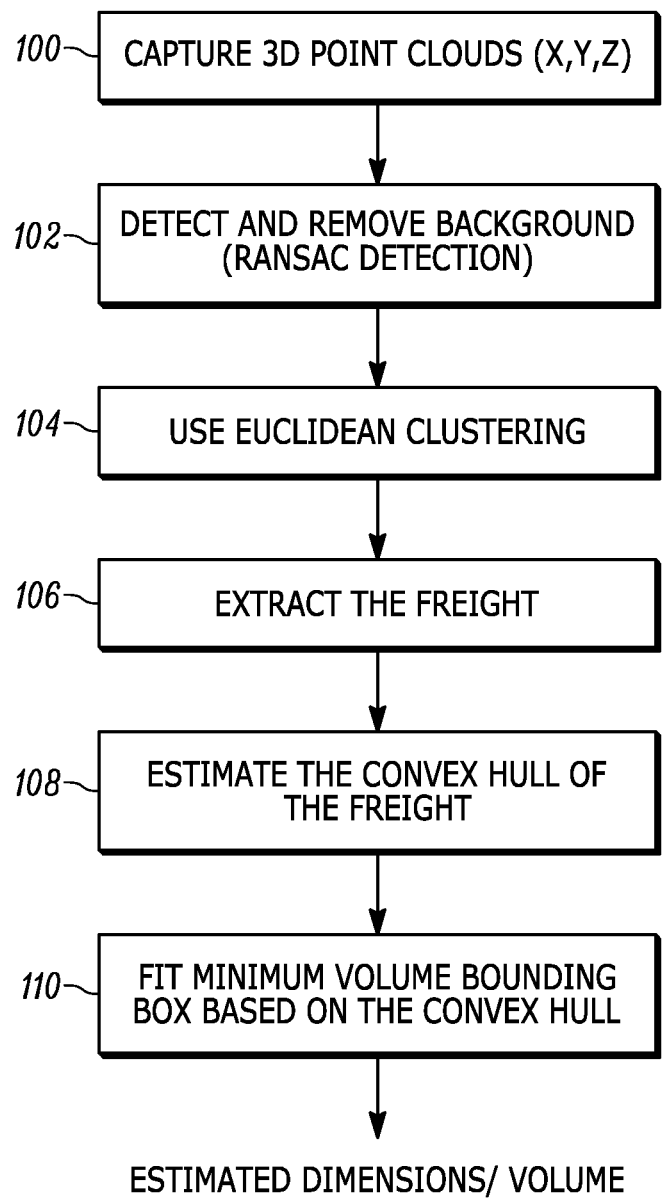
FIG. 11 is a flow chart depicting several steps of a method in accordance with this disclosure.

In operation, the server 16, as shown in FIG. 5, estimates the dimensions of the freight 12 by executing certain dimensioning algorithms, as schematically illustrated in FIG. 11, on the data points of the point clouds 40 captured by the 3D cameras 20. More particularly, as shown in the flowchart of FIG. 6, each one (1 . . . n) of the cameras 20 captures the point clouds 40 in step 46, and the server 16 translates and rotates the point clouds to a common origin in step 48. The common origin can be any one of the cameras, or any geographic point in the warehouse 10. For example, the common origin may be a geographic point centered in the 3D zone 18. The server 16 combines the point clouds 40 in step 50 in various ways, as described below in connection with FIG. 11. The server 16 also commands the cameras 20 of FIG. 6 to simultaneously operate in step 38.

Figure 7:
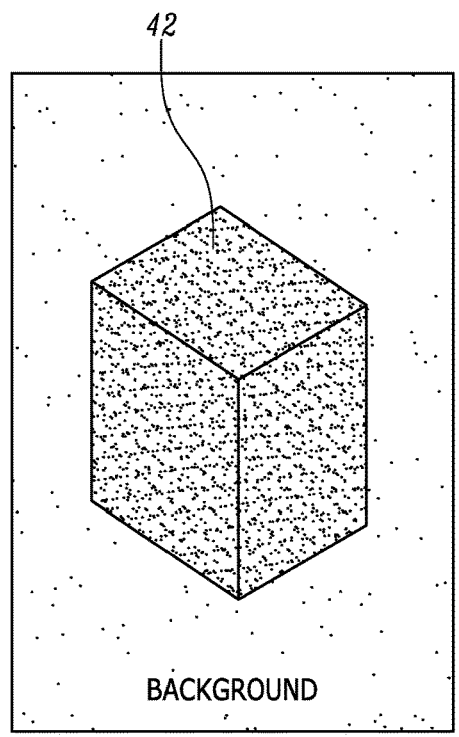
FIG. 7 is a perspective view of a combined point cloud captured by the 3D cameras of FIG. 1.

Thus, in step 50, the server 16 initially combines the point clouds 40 to obtain, as shown in FIG. 7, a combined point cloud that includes points from the freight 12 and from the background, e.g., the forklift 22 and the floor. In step 52, the points from the background are separated from the points from the freight 12, and removed to form a composite point cloud 42.

In a preferred embodiment, as shown in FIG. 11, after the point clouds have been captured in step 100, the detecting of the background is performed in step 102 by determining from the data points the plane having the largest area in the field of view, e.g., by executing a random sampling consensus (RANSAC) algorithm. Details of plane detection by using the RANSAC algorithm can be had by reference to "Plane Detection in Point Cloud Data", by Yang et al., Technical Report No. 1, Department of Photogrammetry, University of Bonn, Jan. 25, 2010, the entire contents of which is incorporated herein by reference thereto.

Once the base plane or background has been detected, its data points can be removed from the combined point cloud. The remaining data points are then clustered, e.g., by Euclidean clustering, in step 104. Clustering is a well established technique in which a multitude of data points are organized into groups that share some similarity, e.g., a distance or closeness to each other. Now that the data points have been clustered, the freight 12 can now be extracted and located in step 106.

Then, in step 54, the server 16 forms a minimum bounding box 44 (see FIG. 8) about the composite point cloud 42. The bounding box 44 has height, width, and depth dimensions, and these dimensions, as determined from the bounding box 44, are used to dimension the freight 12 in step 56. More particularly, the extracted, clustered data points belonging to the freight 12 are processed to obtain a convex hull in step 108. The convex hull constitutes only those exterior data points located on the outside boundary or envelope of the data points belonging to the freight 12. Obtaining the convex hull is also a well established technique of estimating the boundary of multiple data points. In this case, the convex hull of the freight 12 is determined, and the remaining interior data points of the data points belonging to the freight 12 inside the convex hull are discarded.

Figure 8:
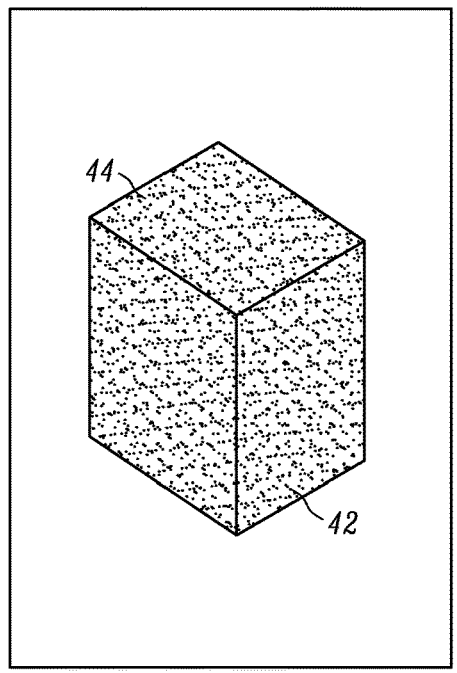
FIG. 8 is a perspective view of a minimum bounding box containing a composite point cloud.

The bounding box 44 is fitted, in step 110, to enclose the convex hull with a minimum volume. Fitting a bounding box 44 of minimum volume around data points is also a well established technique. In this case, the bounding box 44 has a rectangular parallelepiped or cuboid shape having three pairs of mutually orthogonal planar faces, and is fitted around the convex hull. As can be seen in FIG. 8, the volume of the bounding box 44 closely matches the dimensions or volume of the extracted, clustered data points of the freight 12, thereby accurately dimensioning the freight 12. The bounding box 44, as proposed by the present disclosure, is oriented with certain facial constraints. Specifically, at least one of the faces of the bounding box 44, e.g., a top face, is oriented to be generally parallel to the floor, and simultaneously one of the other faces of the bounding box 44, e.g., a side face, is oriented to be orthogonal to the top face.

The freight 12 can be weighed at any time. The freight 12 can be weighed prior to entry into the 3D zone 18, or after exit from the 3D zone 18. Advantageously, the freight 12 is simultaneously weighed by the scale 34 in step 58 while the freight 12 is being dimensioned in the 3D zone 18. One benefit to weighing the freight 12 simultaneously with dimensioning the freight 12 is that the weight and dimensions can be simultaneously associated with the freight 12, typically by reading a freight identifier, e.g., a bar code symbol on the freight 12 or on a palette for the freight, or a radio frequency (RF) identification (RFID) tag on the freight 12 or on a palette for the freight. After being weighed and dimensioned, the freight 12 is moved to the shipping container, where the freight 12 is loaded in step 60.

As described above, each camera 20, as shown in FIG. 4, captures a plurality or set or collection of the point clouds 40 of voxels or data points from the moving freight 12. Each voxel or point is associated with a set of coordinates, for example, Cartesian coordinates (x, y, z) that together define a position of each point. Each voxel or point also has a range or depth value indicative of a distance between a respective 3D camera 20 and the freight 12, and/or an intensity value indicative of a received signal strength captured by the respective 3D camera 20 from the freight 12. The different cameras 20 have inherently different characteristics, especially when they are looking at the freight 12 along different lines of sight. A single camera 20 operating at different wavelengths along a common line of sight also has inherently different characteristics. These different characteristics result in an ambiguity in the exact position of each point from the freight 12. For example, a first camera 20 spaced away from the freight 12 at a first spacing will locate a first range/depth value or distance to a point on the freight 12 with a certain first accuracy and a first precision, whereas a second camera 20 spaced away from the freight 12 at a second spacing will locate a second range/depth value or distance to that same point on the freight 12 with a certain second accuracy and a second precision. These range/depth values will, in practice, not be the same, and the ambiguity in the exact location of that point worsens when additional cameras 20, especially of different types, are utilized and looking at that same point. Similarly, the intensity values will also, in practice, not be the same.

In order to resolve such positional ambiguities, the server 16, in one embodiment, combines the point clouds 40 by averaging the sets of the coordinates of each point. Thus, the coordinates from all the cameras 20 for each point are summed, and divided by the number of the cameras 20, thereby obtaining an average set of coordinates for each point. In another embodiment, the server 16 weights the sets of the coordinates of each point from the different 3D cameras 20 with different weighting factors that are based on the range value and/or the intensity value, prior to averaging. For example, the coordinates of a point from a camera 20 located closer to the freight 12 may be weighted more heavily than the coordinates of the same point from a camera located further away from the freight, and vice versa. Thus, the weighted coordinates from all the cameras 20 for each point are summed, and divided by the number of the cameras 20, thereby obtaining an average weighted set of coordinates for each point.

The 3D cameras may have different types of the sensors, e.g., ones having wide or narrow fields of view, or ones having different technology types, in which case, the server 16 weights the sets of the coordinates of each point from the different 3D cameras 20 with different weighting factors that are based on the different types of the sensors, prior to averaging. For example, the coordinates of a point from a camera 20 having a narrow field of view may be weighted more heavily than the coordinates of the same point from a camera having a wide field of view, and vice versa. For certain cameras, each point has a confidence value, which may, in one embodiment, be indicative of the distance between the respective 3D camera and the freight, and, in another embodiment, be indicative of the received signal strength or reflectivity of the freight 12. For example, the freight may have a reflective outer surface that returns light of greater intensity than a matte outer surface that absorbs light. In such case, the server 16 weights the sets of the coordinates of each point from the different 3D cameras 20 based on the confidence value, prior to averaging. Thus, the coordinates of a point having a higher confidence value will be weighted more heavily than the coordinates of the same point having a lower confidence value, and vice versa.

The 3D cameras 20 may also operate under variable environmental conditions, such as bright or dim lighting, cold or hot temperatures, clean or dusty air, dry or moist climate, etc. In such cases, the server 16 is operative for weighting the sets of the coordinates of each voxel from the different 3D cameras with different weighting factors that are based on the variable environmental conditions. As previously mentioned, each field of view is angular, i.e., includes a solid angle in space. Voxels captured from a central region of a respective field of view may be weighted differently from voxels captured at the end regions of the respective field of view. In such cases, the server 16 is operative for weighting the sets of the coordinates of each voxel from the different 3D cameras with different weighting factors that are based on the angle of the respective voxel in the respective field of view. For example, a voxel captured at a sharper (more skewed) angle may be afforded less weight than a voxel captured at a less sharp (more central) angle.

Figure 9:
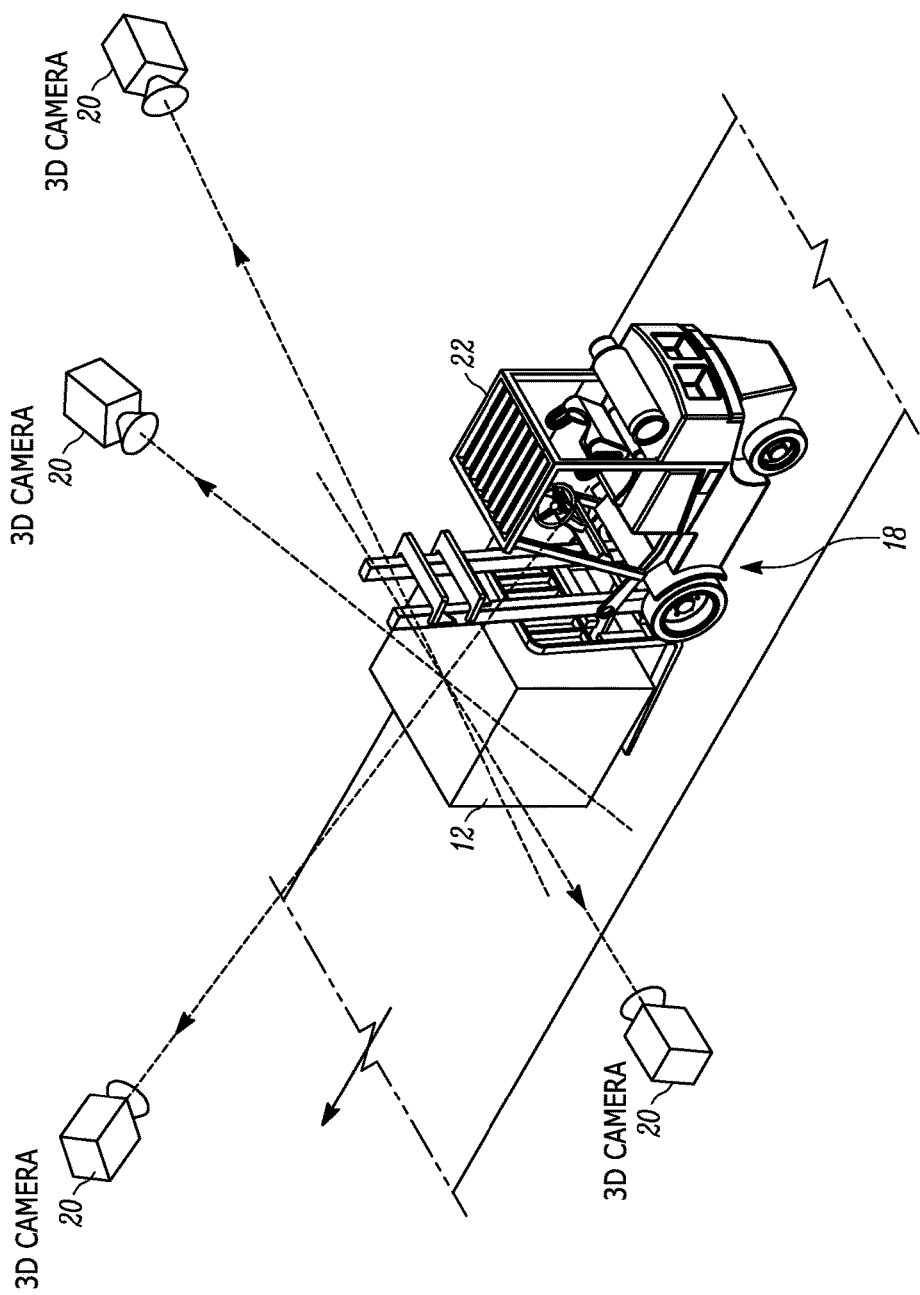
FIG. 9 is a perspective view of a forklift moving freight past a plurality of 3D cameras in accordance with another embodiment of this disclosure.
Figure 10:
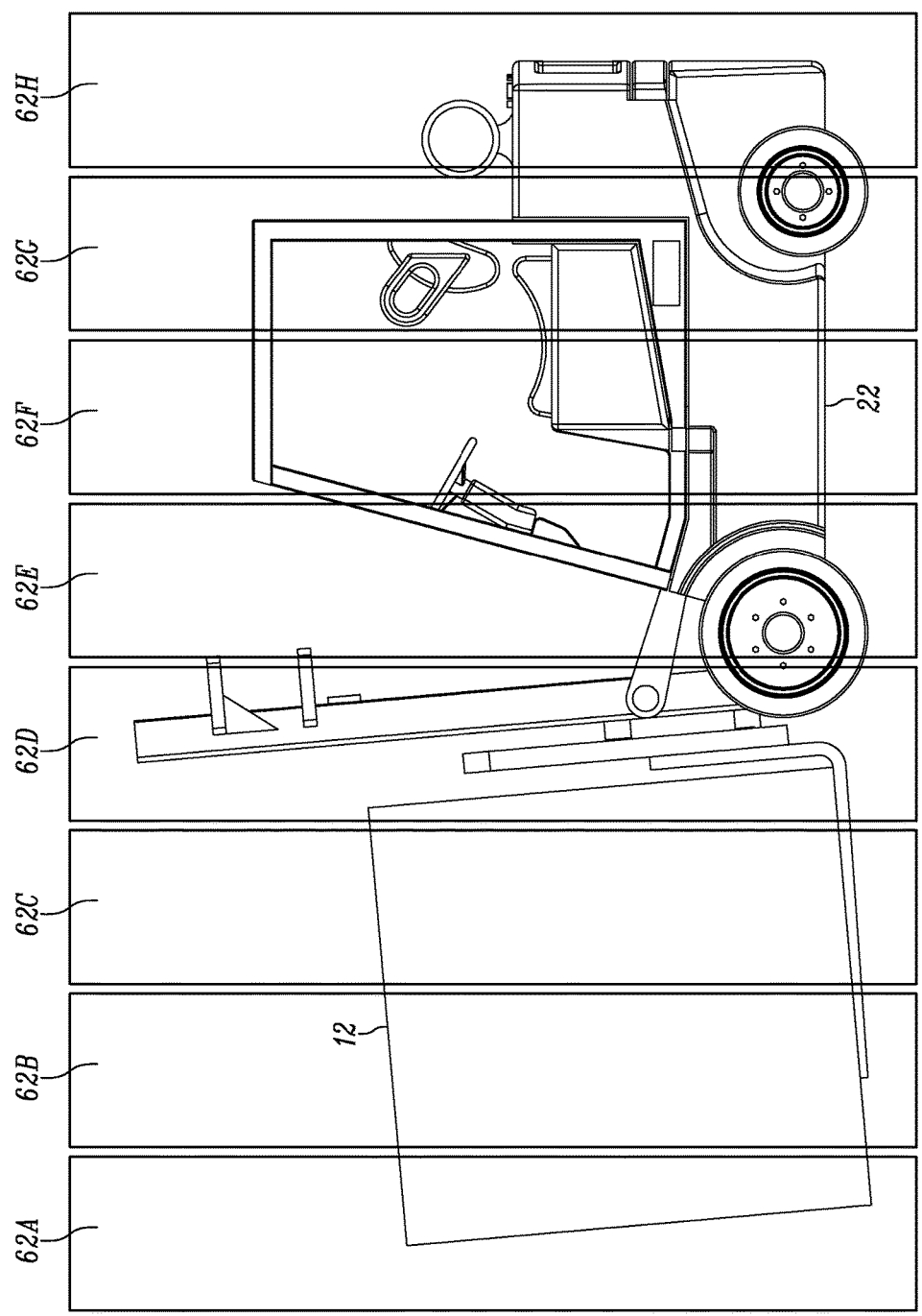
FIG. 10 is a side view of a plurality of incremental images captured by at least one of the 3D cameras of FIG. 9.

In accordance with another embodiment, as shown in FIG. 9, the 3D cameras 20 are positioned not only above the 3D zone 18, but also at opposite sides of the 3D zone 18 closer to floor level. Otherwise, as described before, the various 3D cameras 20 look at the freight 12, and any positional ambiguities are resolved by any of the techniques described above. Rather than simultaneously operating all the 3D cameras 20, one or more of the cameras 20 in FIG. 9, preferably the side cameras, can be sequentially operated to generate a sequence of captured images 62A-62H (see FIG. 10) of the freight 12 on the forklift 22. Each of these incremental images may be stitched together by the server 16 by well known image stitching techniques to form a composite image that forms a point cloud, which is then processed as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A system comprising:
  a first three-dimensional (3D) camera deployed at a zone through which freight is conveyed to a container, and having a first field of view, the first 3D camera configured to generate a first point cloud of voxels representative of the freight;
  a second 3D camera deployed at the zone and having a second field of view narrower than the first field of view, the second 3D camera configured to generate a second point cloud of voxels representative of the freight; and
  a dimensioner in communication with the first and second 3D cameras, the dimensioner configured to:
    weigh the voxels of to the first point cloud based on respective angles of the voxels relative to the center of the first field of view of the first 3D camera;
    weigh the voxels of to the second point cloud based on respective angles of the voxels relative to a center to a center of the second field of view of the second 3D camera;
    combine the first and second point clouds to obtain a composite point cloud representative of the freight;
    enclose the composite point cloud with a bounding box having dimensions and facial constraints, wherein the facial constraints include a predetermined orientation of at least one face of the bounding box with respect to one of the zone through which freight is conveyed and at least another face of the bounding box; and
    dimension the freight using the dimensions of the bounding box enclosing the composite point cloud, wherein the dimensioner is implemented by a processor.

2. The system of claim 1, wherein the first and second 3D cameras are stationary and are aimed at the freight along different lines of sight, and further comprising a freight mover configured to uninterruptedly move the freight through the zone past the first and second 3D cameras.

3. The system of claim 1, further comprising a scale configured to weigh the freight simultaneously with the freight being dimensioned while the freight is uninterruptedly moved through the zone.

4. The system of claim 1, further comprising a detector configured to trigger the first and second 3D cameras to capture the first and second point clouds upon entry of the freight in the zone.

5. The system of claim 1, wherein:
  each voxel is associated with a set of coordinates that define a position of each voxel;
  the first and second 3D cameras capture a plurality of the sets of the coordinates of each voxel; and
  the dimensioner combines the point clouds by averaging the sets of the coordinates of each voxel from the first and second 3D cameras.

6. The system of claim 5, wherein:
  each voxel has one of a range value indicative of a distance between a respective one of the first and second 3D camera and the freight, and an intensity value indicative of received signal strength; and
  the dimensioner is configured to weigh the sets of the coordinates of each voxel from the first and second 3D cameras with different weighting factors that are based on at least one of the range value and the intensity value.

7. The system of claim 5, wherein:
  each voxel has a confidence value; and
  the dimensioner is configured to weigh the sets of the coordinates of each voxel from the first and second 3D cameras based on the confidence value.

8. The system of claim 5, wherein:
  the first and second 3D cameras operate under variable environmental conditions; and
  the dimensioner is configured to weigh the sets of the coordinates of each voxel from the first and second 3D cameras with different weighting factors that are based on the variable environmental conditions.

9. The system of claim 1, wherein the dimensioner is further configured to:
  assign a first weight to the first point cloud based on the second 3D camera having a narrower field of view than the first 3D camera;
  assign a second weight to the second point cloud based on the second 3D camera having a narrower field of view than the first 3D camera, wherein the first weight is different than the second weight; and
  combine the first and second point clouds according to the first and second weights to obtain the composite point cloud.

* * * * *